United States Patent [19]

Malek

[11] Patent Number: 5,786,963

[45] Date of Patent: Jul. 28, 1998

[54] SERVO INFORMATION RECORDING METHOD AND APPARATUS FOR AN ENCLOSED DATA STORAGE SYSTEM

[75] Inventor: Sattar S. Malek, San Jose, Calif.

[73] Assignee: International Business Machines Corporation, Armonk, N.Y.

[21] Appl. No.: 741,827

[22] Filed: Oct. 31, 1996

Related U.S. Application Data

[62] Division of Ser. No. 323,518, Oct. 14, 1994, Pat. No. 5,627,698.

[51] Int. Cl.⁶ .................................................. G11B 21/08
[52] U.S. Cl. .................................... 360/106; 360/104
[58] Field of Search ............................. 360/75, 69, 106, 360/109, 104, 105

[56] References Cited

U.S. PATENT DOCUMENTS

| 4,831,470 | 5/1989 | Brunnett et al. | 360/75 |
| 4,980,783 | 12/1990 | Moir et al. | 360/75 X |

FOREIGN PATENT DOCUMENTS

| 2-33781 | 2/1990 | Japan. |
| 3-73406 | 3/1991 | Japan. |
| 3-272067 | 12/1991 | Japan. |
| 4-26966 | 1/1992 | Japan. |
| 4-332974 | 11/1992 | Japan. |
| 4-345975 | 12/1992 | Japan. |
| 5-205414 | 8/1993 | Japan. |

*Primary Examiner*—Aristotelis M. Psitos
*Assistant Examiner*—James C. Habermehl
*Attorney, Agent, or Firm*—Merchant Gould Smith Edell Welter & Schmidt

[57] ABSTRACT

A novel apparatus and method for recording servo information on a data storage disk disposed within a enclosed data storage system housing. A small access aperture is provided on the housing proximate the pivot axis of a rotatably mounted actuator which permits access to the actuator through the housing. A unique coupling apparatus is installed on or, alternatively, fashioned as an integral part of the actuator to facilitate engagement with a precision pivot assembly of a servo writer at a plurality of engagement locations around the actuator pivot axis. Undesirable residual positional movement of the actuator and transducers during the servo writing procedure associated with shifting or settling of bearings disposed in a bearing cartridge of the actuator rotation assembly is significantly reduced or virtually eliminated by the equal distribution and passivation of torquing forces around the actuator pivot axis.

10 Claims, 11 Drawing Sheets

SERVO INFORMATION RECORDING METHOD AND APPARATUS FOR AN ENCLOSED DATA STORAGE SYSTEM

This is a Divisional application of Ser. No. 08/323,518, filed Oct. 14, 1994, now U.S. Pat. No. 5,627,698 which application(s) are incorporated herein by reference.

FIELD OF THE INVENTION

The present invention relates generally to data storage systems, and more particularly, to a method and apparatus for writing servo information to a data storage disk disposed within an enclosed housing.

BACKGROUND OF THE INVENTION

A typical data storage system includes one or more data storage disks coaxially mounted on the hub of a spindle motor. The spindle motor rotates the disks at speeds typically on the order of several thousand revolutions-per-minute. Digital information is typically written to and read from the data storage disks by one or more magnetic transducers, or read/write heads, which are mounted to an actuator and moved radially above and/or below the surfaces of the rotating data storage disks.

The actuator typically includes a plurality of outwardly extending actuator arms, with one or more magnetic read/write transducers being mounted resiliently or rigidly on the extreme end of the actuator arms. The actuator arms are interleaved into and out of the stack of rotating magnetic disks, typically by means of a coil assembly mounted to the actuator. The coil assembly generally interacts with a permanent magnet structure, and the application of current to the coil in one polarity causes the actuator arms and transducers to shift in one direction, while current of the opposite polarity shifts the actuator arms and transducers in an opposite direction.

In a typical digital data storage system, digital information is stored in the form of magnetic energization on a series of concentric, closely spaced tracks arranged on the surface of the magnetizable rigid data storage disks. The tracks are generally divided into a plurality of sectors. One of the informational fields is typically designated for storing data, while other fields contain sector identification and synchronization information, for example. Data is transferred to, and retrieved from, specified track and sector locations by the magnetic transducers being shifted from track to track, typically under the control of a controller provided in the data storage system. The transducer assembly typically includes a read element and a write element.

Writing data to a data storage disk generally involves passing a current through the write element of the transducer assembly to produce magnetic lines of flux which magnetize a specific location of the disk surface. Reading data from a specified disk location is typically accomplished by a read element of the transducer assembly sensing the magnetic field or flux lines emanating from the magnetized locations of the disk. As the read element moves over the rotating disk surface, the interaction between the read element and the magnetized locations on the disk surface result in voltage pulses being induced in the read element. The voltage pulses represent transitions in the magnetic field and demarcate the data storing locations of the disk.

Conventional data storage systems generally employ a closed-loop servo control system for accurately and rapidly positioning the actuator and read/write transducers to specified storage locations on the data storage disk. A servo writing procedure is typically implemented to record servo information on the surface of one or more data storage disks comprising the data storage system. A servo writer assembly is typically used by manufacturers of data storage systems to facilitate the transfer of servo data to one or more data storage disks during the manufacturing process. In accordance with a known servo information format, termed an embedded servo, servo information is written between the data storing sectors of each track. The servo data is thus embedded in the data storing tracks of the data storage disks, typically resulting in an alternating sequence of data and servo sectors comprising each track. In accordance with another known servo information format employed in data storage systems, termed a dedicated servo, the servo writer records servo information typically on only one of the data storage disks comprising the disk stack, and often on only one of surfaces of the dedicated servo disk. The servo information stored on the dedicated servo disk is used to maintain accurate positioning and alignment of the read/write transducers associated with each of the data storage disks. During normal data storage system operation, a servo transducer, generally mounted proximate the read/write transducers, is typically employed to read the servo sector data for the purpose of locating specified track and data sector locations on the disk. It is noted that a servo sector typically contains a pattern of data bits, often termed a servo burst pattern, used to maintain optimum alignment of the read/write transducers over the centerline of a track when reading and writing data to specified data sectors on the track.

In high capacity data storage systems, it is generally desirable to employ data storage disks having track densities in excess of three thousand tracks per radial inch. In an effort to maximize the amount of disk surface area available for storing data, the width of each track and the distance separating adjacent tracks is generally reduced to a minimal dimension, with the minimum track width and separation distance between adjacent tracks being dictated by the physical dimensions of the read/write and servo transducers. Track occlusion, generally associated with the overlapping or obscuring of track boundaries, also impacts the minimum track width and separation distance between adjacent tracks. To ensure accurate track seeking and alignment when reading and writing data to the disk, the servo writer must precisely and reliably record the servo data on the disk during the servo writing procedure, which is typically performed at the data storage system manufacturing facility.

Figure 2:
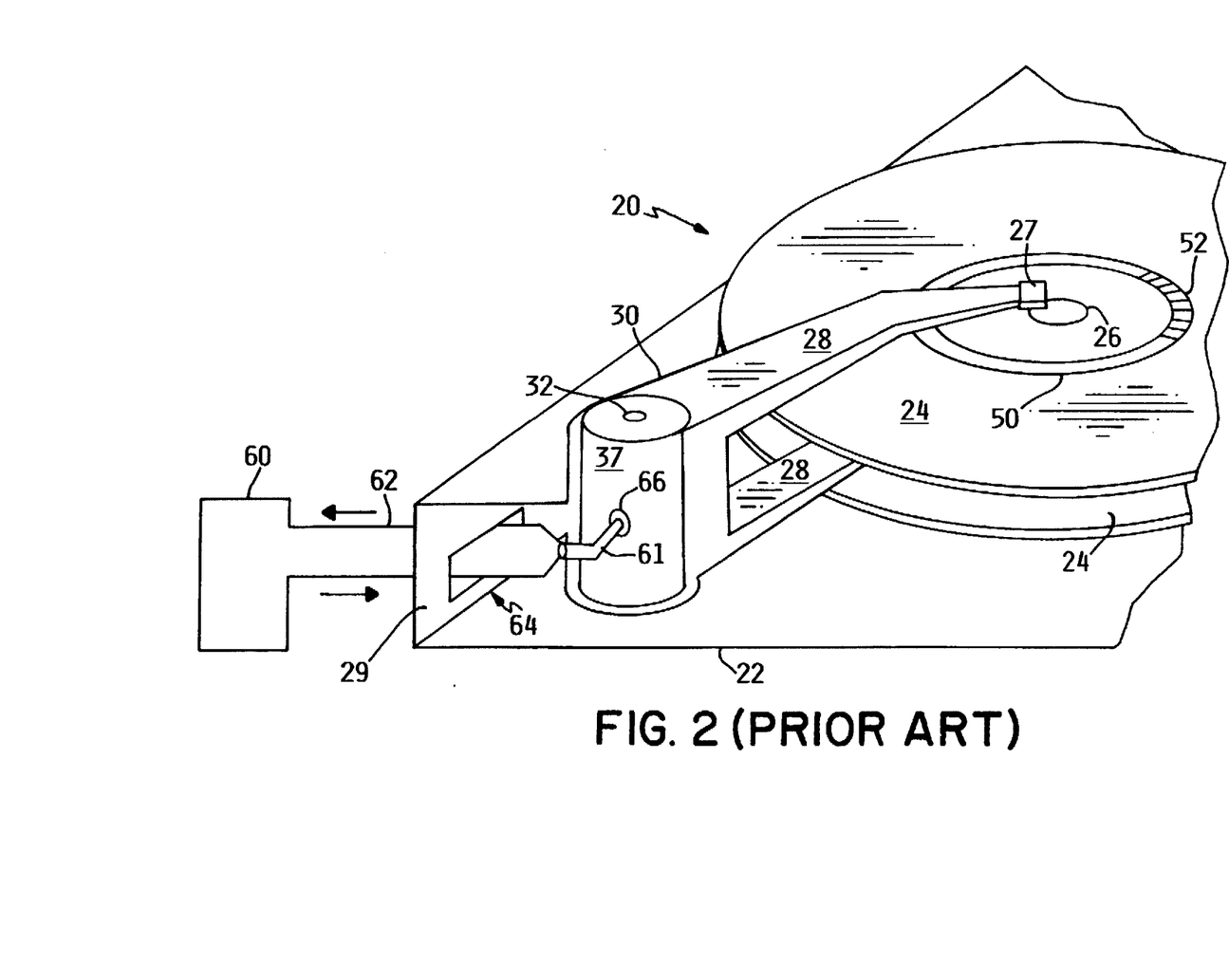
FIG. 2 is a partial top perspective view of a data storage system and a conventional linear displacement assembly of a servo writer assembly adapted for moving the actuator during the servo writing procedure.

A conventional method and apparatus for writing servo information to a data storage disk is illustrated in FIG. 2. An actuator 30, with one or more transducers 27 mounted to the end of the actuator arms 28, is engaged by a separate linear displacement assembly 60 which produces a torquing force on the actuator 30 causing the actuator arms 28 and read/write transducers 27 to move radially across the data storage disk surfaces 24. It is noted that a servo writer assembly generally utilizes the read/write transducers 27 of the data storage system 20 to record servo information on the data storage disks 24 during the servo writing procedure, rather than utilizing a separate transducer and actuator assembly. The linear displacement assembly 60 typically includes a push-rod 62 which extends through a relatively large window 64 provided in a sidewall 29 or other portion of the housing base 22. The push-rod 62 is generally coupled to a coupling rod 61 extending outwardly from the back end 37 of the actuator 30. Alternatively, the actuator back end 37 may include a receiving hole 66 for receiving the push-rod 62. It is noted that the coil assembly 36 and coil frame 34 are omitted from the actuator 30 illustration of FIG. 2 for purposes of clarity.

The linear displacement assembly 60 displaces the push-rod 62 in a forward and reverse linear direction which, in turn, exerts a localized torquing force at the actuator 30/push-rod 62 interface 66 on the back end 37 of the actuator 30, thereby causing the actuator 30 to rotate. The linear displacement assembly 60 typically displaces the push-rod 62 with a relatively high degree of precision in an attempt to accurately locate the transducers 27 typically above the centerline of the tracks 50 while writing servo information to the servo sectors 52 on the data storage disk 24. The linear displacement assembly 60, push-rod 62, and actuator 30 must generally operate to precisely position the transducers 27 above the centerline of the tracks 50 to avoid unintended positional shifting of the transducers 27 and to avoid undesirable rotational movement of the transducers 27 into the narrow gap separating adjacent tracks 50 when writing servo data to the data sectors 52. It can be appreciated that any appreciable amount of unintended residual movement of the actuator 30 during the servo writing procedure can result in the misalignment of the transducers 27 when writing servo data to the disks 24 and subsequent read/write errors of varying severity.

Figure 3:
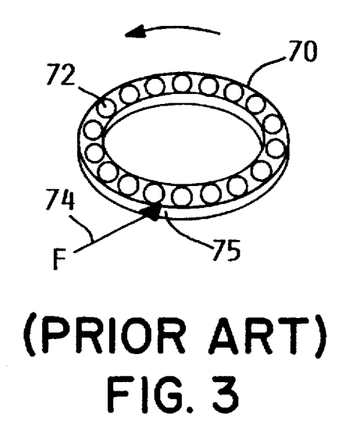
FIG. 3 is an illustration of a ball bearing cartridge subjected to a localized torquing force produced by a conventional linear displacement assembly during the servo writing procedure.

A major source of transducer 27 misalignment occurring during the servo writing procedure has been determined to be associated with residual shifting or settling of a ball bearing assembly 70 employed to facilitate actuator 30 rotation. As illustrated in FIG. 3, a conventional bearing cartridge 70 includes a number of individual precision machined ball bearings 72 encased within a circular bearing cartridge 70. In practice, the inner diameter of the bearing cartridge 70 mechanically engages a stationary actuator shaft 32, while the outer diameter of the bearing cartridge 70 mechanically engages the inner diameter of a cylindrical bore 96 defining the rotational axis of the actuator 30. It has been determined that the traditional approach of moving the actuator 30 during the servo writing procedure with a conventional linear displacement assembly 60 and push-rod 62, as illustrated in FIG. 2, produces a torquing force localized at the actuator 30/push-rod 62 interface 66 which is imparted to the bearing cartridge 70 as a torquing force 74 localized at a single contact region 75 on the bearing cartridge 70. This localized torquing force 74 impinging on the bearing cartridge 70 contact region 75 results in unintended residual movement or settling of the ball bearings 72 within the bearing cartridge 70 after the actuator 30 has been precisely positioned at a specified servo sector location. The undesirable residual shifting of the bearings 72 and bearing cartridge 70 results in a corresponding positional shifting of the actuator 30 and transducers 27 while servo information is being written to the data storage disks 24. As track 50 densities continue to increase, the residual shifting of the ball bearings 72 and bearing cartridge 70 has become a major contributor to incidents of transducer 27 misalignment and servo information recording errors arising during the servo writing procedure.

Another source of servo writing errors associated with a conventional linear displacement assembly 60 concerns the relationship between the movement of the push-rod 62 and the resulting rotation of the actuator 30. More particularly, as the actuator 30/push-rod 62 interface 66 rotates away from a perpendicular orientation with respect to the linear displacement assembly 60, the magnitude of push-rod 62 displacement is non-linearly related to the magnitude of resulting actuator 30 rotation. Those skilled in the art can appreciate the difficulty of controlling the non-linear cooperative movement between the linear displacement assembly 60 and rotatably mounted actuator 30 to effectuate high-precision positioning of the transducers 27 during the servo writing procedure.

A trend has developed in the data storage system manufacturing community to miniaturize the chassis or housing of a data storage system to a size amenable for incorporation into miniature personal computers, such as lap-top computers, for example. Various industry standards have emerged that specify the external housing dimensions of small and very small form factor data storage systems. One such recognized family of industry standards is the PCMCIA (Personal Computer Memory Card Industry Association) family of standards, which specifies both the dimensions for the data storage system housing and the protocol for communicating control and data signals between the data storage system and a host computer system coupled thereto. Recently, four families or types of PCMCIA device specifications have emerged. By way of example, a Type-I PCMCIA data storage system must be fully contained within a housing having a maximum height dimension of 3.3 millimeters (mm). By way of further example, a Type-II PCMCIA device housing must not exceed a maximum height of 5.0 mm in accordance with the PCMCIA specification. A maximum height of 10.5 mm is specified for the housing of Type-III PCMCIA devices, and Type-IV devices are characterized as having a maximum housing height dimension in excess of 10.5 mm.

The structural stability of the protective housing of small and very small form factor data storage systems is of particular concern as the thickness dimensions of the housing structure of such systems continue to be reduced in order to meet the stringent dimensional requirements specified by the PCMCIA and other industry standards, as well as to minimize the weight of data storage systems. The extremely compact housing configuration of small and very small form factor data storage systems require that the sensitive internal components be placed in close proximity to one another. Any appreciable distortion or warping of the housing base or cover can result in deleterious contact between adjacent components, often resulting in catastrophic damage to the data storage system. It has been determined that by providing an access window 64 having dimensions sufficient to accommodate the push-rod 62 of a conventional linear displacement assembly 60, the structural integrity of the data storage system housing for relatively small and very small form factor data storage systems may be adversely compromised. Moreover, it is believed that an access window 64 suitable for accommodating a conventional linear displacement assembly 60 and push-rod 62 would severely compromise the structural integrity of a non-metallic housing structure for relatively small form factor data storage systems.

There exists a need in the data storage system manufacturing industry for a servo writer apparatus and methodology that provides accurate and stable positioning of the actuator and transducer when writing servo information to a data storage disk. There exists the further need to provide a means for accessing the actuator through the housing of a data storage system by an external servo writer in a manner which does not adversely affect the structural integrity of the housing. The present invention fulfills these and other needs.

SUMMARY OF THE INVENTION

The present invention is an apparatus and method for recording servo information on a data storage disk disposed within a enclosed data storage system housing. A small access aperture is provided on the housing proximate the pivot axis of a rotatably mounted actuator and permits access to the actuator through the housing. A unique coupling apparatus is disposed on the actuator to facilitate engagement with a precision pivot assembly of a servo writer at a plurality of engagement locations around the actuator pivot axis. Undesirable residual rotational movement of the actuator and transducers during the servo writing procedure associated with shifting or settling of bearings disposed in a bearing cartridge of the actuator rotation assembly is significantly reduced or virtually eliminated by the equal distribution and passivation of torquing forces around the actuator pivot axis.

DETAILED DESCRIPTION OF THE PREFERRED EMBODIMENTS

Figure 1:
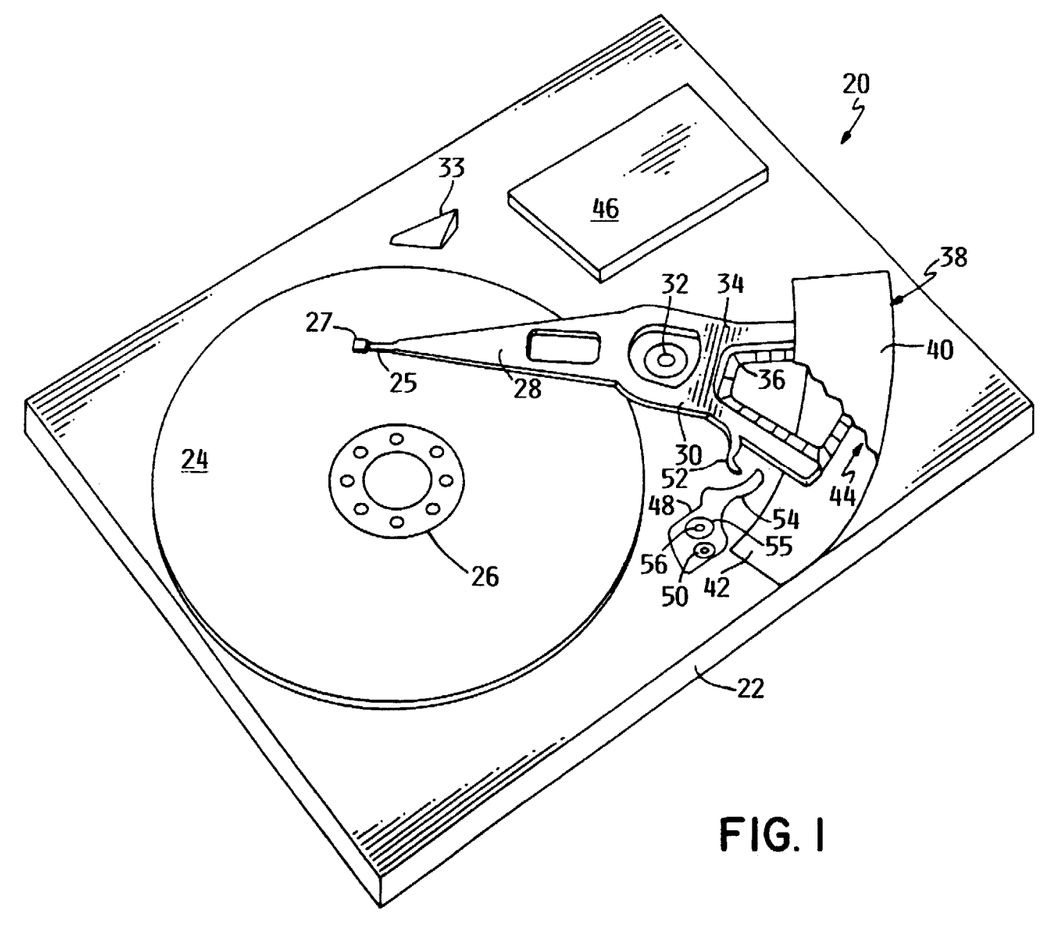
FIG. 1 is a top perspective view of a data storage system mounted to a housing base with the upper housing cover removed.

Referring now to the drawings, and more particularly to FIG. 1, there is shown a plurality of components comprising a data storage system 20. The various system components are shown mounted on a housing base 22, with the housing cover 23 removed from the base 22. The data storage system 20 typically includes one or more rigid data storage disks 24 which are stacked coaxially in a tandem spaced relationship, and rotate about a common spindle motor 26 at a relatively high rate of rotation. Each disk is preferably formatted to included a plurality of spaced concentric tracks 50, with each track being partitioned into a series of data and servo sectors 52 which, in turn, are further divided into various informational fields.

An actuator 30 typically includes a plurality of interleaved actuator arms 28, with each arm 28 having one or more magnetic transducers 27 mounted to a load beam 25 for reading and writing information magnetically onto the data storage disks 24. The actuator 30 is usually mounted to a stationary actuator shaft 32, and rotates thereon to move the actuator arms 28 into and out of the stack of data storage disks. A coil assembly 36, mounted to a coil frame 34 of the actuator 30, generally rotates within a gap 44 defined between the upper and lower magnet assemblies 40 and 42 of a permanent magnet structure 38, causing the actuator arms 28, in turn, to sweep over the surfaces of the data storage disks 24. The motor spindle 26 typically comprises a three-phase a.c. motor energized by a stepping power supply 46 for rotating the data storage disks 24.

The coil assembly 36 and the upper and lower magnet assemblies 40 and 42 of the permanent magnet structure 38 operate in cooperation as a voice coil motor responsive to control signals produced by a controller 58. The voice coil motor produces a torquing force on the actuator coil frame 34 of the actuator 30 when control currents of varying direction and magnitude flow in the coil assembly 36 in the presence of a magnetic field produced by the permanent magnet structure 38. The torquing forces imparted on the actuator coil frame 34 of the actuator 30, in turn, cause corresponding rotational movement of the actuator arms 28 in directions dependent on the polarity of the control currents flowing in the coil assembly 36. A controller 58 preferably includes control circuity that coordinates the transfer of data to and from the data storage disks 24, and cooperates with the voice coil motor to move the actuator arms 28 and transducers 27 to prescribed track 50 and sector 52 locations when reading and writing data to the disks 24.

Figure 5:
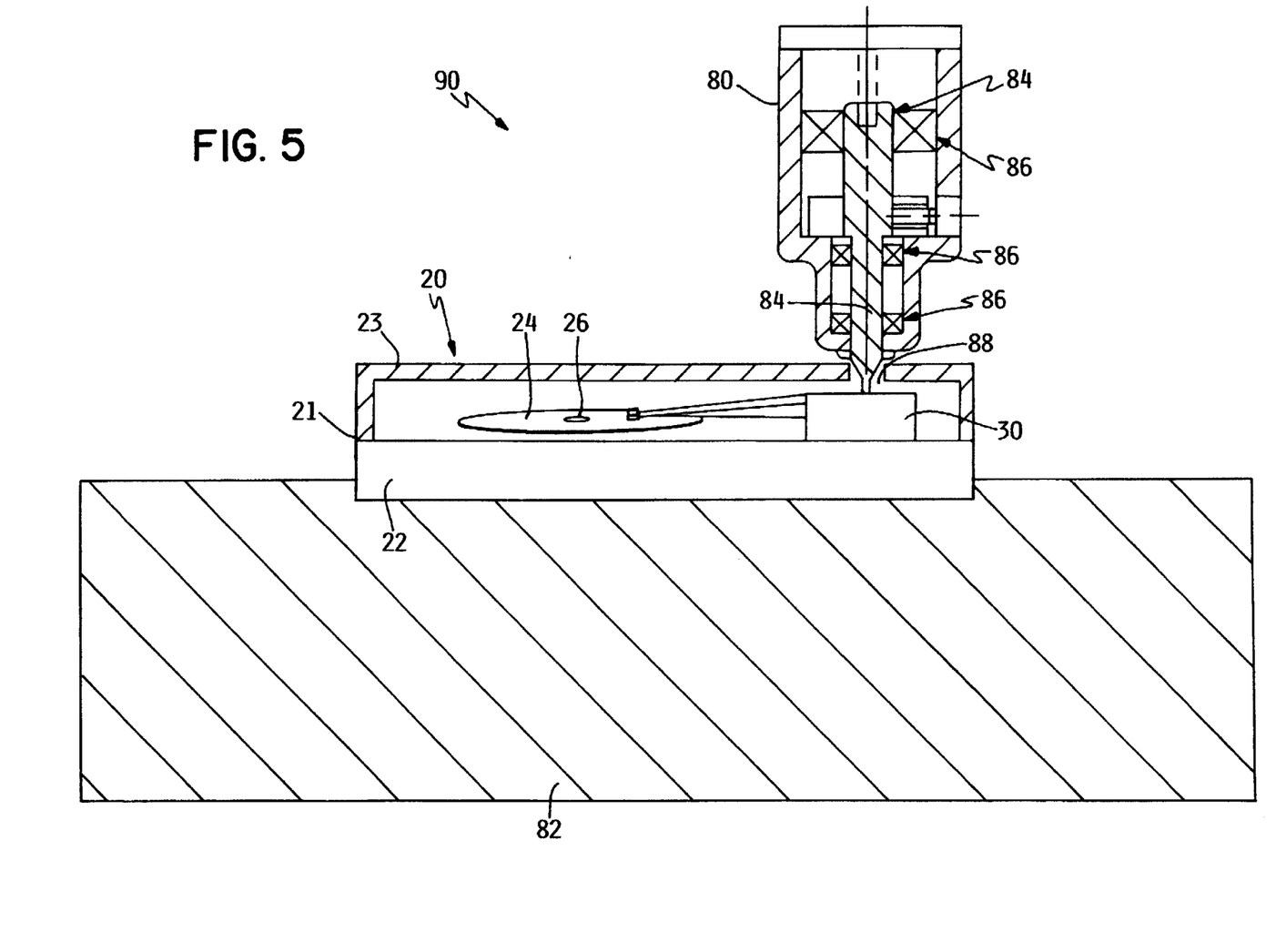
FIG. 5 is a side plan view of a servo writing assembly employing a unique data storage system housing and actuator configuration adapted to cooperate with a precision pivot assembly of a novel servo writing assembly.

Turning now to FIG. 5, there is shown a novel servo writing assembly 90 for writing servo information to a data storage disk 24 of a data storage system 20. The servo writing assembly 90 includes a servo writing fixture 82 upon which a data storage system 20 is typically secured during the servo writing procedure. A precision pivot assembly 80 includes a rotatable shaft 84 adapted for accessing the actuator 30 through the housing 21 of the data storage system 20. A unique engagement apparatus is disposed on either or both of the actuator 30 and rotatable shaft 84 to effectuate accurate and stable rotation and positioning of the actuator 30 and transducers 27 when writing servo data to the data storage disk surfaces 24. The precision pivot assembly, when coupled to the actuator 30, rotates the actuator 30 and transducers 27 to specified track 50 locations with high precision during the servo writing procedure.

It is generally considered desirable to perform the servo writing procedure after final assembly of the data storage system 20, including securing of the cover 23 to the housing base 22. As such, any undesirable warping or distortion of the base 22 and positional shifting of the system components which typically occurs when securely fastening the housing cover 23 to the base 22 is avoided. It is noted that a small amount of base 22 warpage or deformation resulting from housing 21 assembling errors, such as skewing of the base 22 and cover 23 mounting interfaces due to overtightening of a cover-to-base mounting screw, for example, can cause track misalignment problems during the servo writing procedure and subsequent reading and writing errors during normal data storage system 20 operation.

The data storage system 20, illustrated in FIG. 5, includes a novel housing 21 configuration having a base portion 22 and a cover portion 23. The cover 23 preferably includes an access aperture 88 disposed proximate the axis of rotation of the actuator 30. In the embodiment illustrated in FIG. 5, the access aperture 88 permits the rotatable shaft 84 of the precision pivot assembly 80 to be inserted into the housing 21 for coupling with the actuator 30. As such, the housing cover 23 and base 22 need not be disassembled. With the rotatable shaft 84 securely engaging the actuator 30, the precision pivot assembly 80 then rotates the actuator 30 about the actuator shaft 32 to precisely position the transducers 27 over specified track 50 locations when writing servo data to the data disks 24. The alignment deficiencies inherent in prior art actuator linear displacement assemblies, such as the linear displacement assembly 60 illustrated in FIG. 2, are obviated by a novel coupling apparatus employed to facilitate coupling engagement between the rotatable shaft 84 of the precision pivot assembly 80 and the actuator 30.

Figure 6:
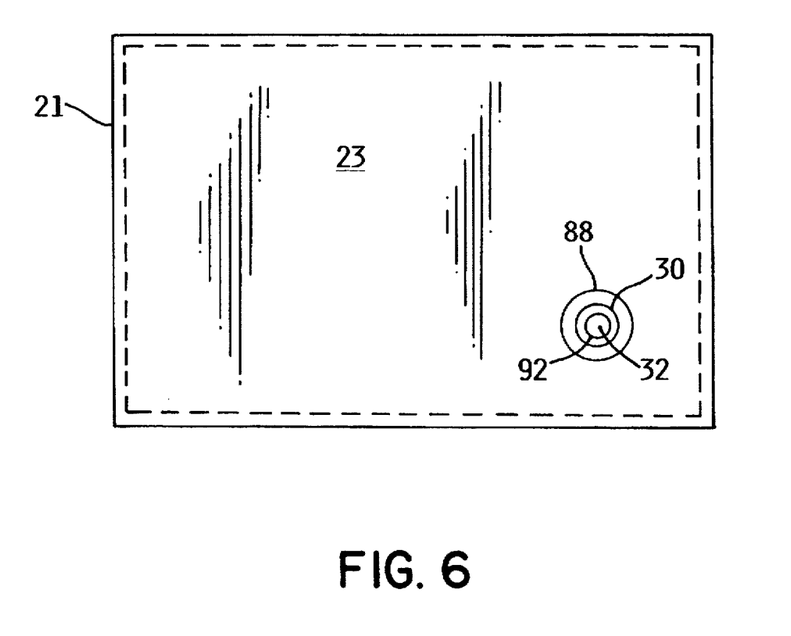
FIG. 6 is a top plan view of a novel housing cover particularly well-suited for use with relatively small and very small form factor data storage systems, the cover having an access aperture provided for implementing a novel servo information recording method and apparatus.
Figure 7:
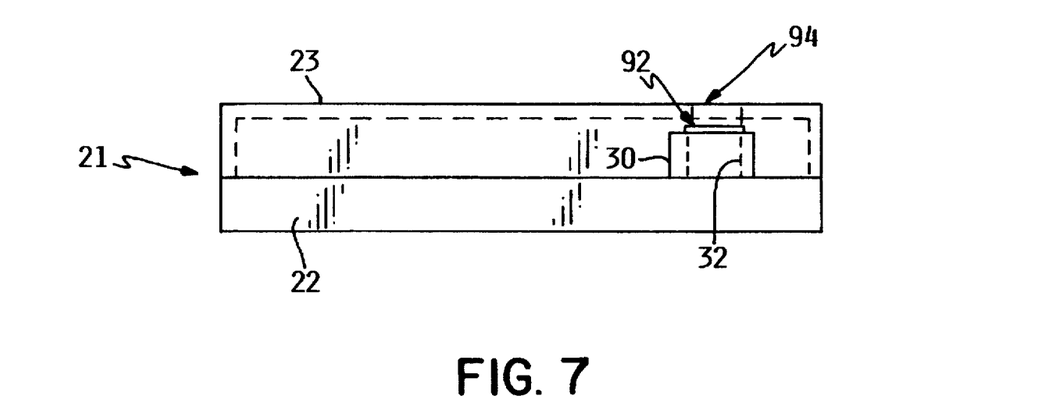
FIG. 7 is a side plan view of the cover and base portions of a data storage system housing adapted for employing a novel servo information recording method and apparatus.

In one embodiment, as illustrated in FIGS. 6 and 7, the cover 23 of the data storage system housing 21 preferably includes a circular access aperture 88 disposed above the actuator shaft 32. The diameter of the circular access aperture 88 is preferably slightly larger than the outer diameter of the rotatable shaft 84. Alternatively, the diameter of the circular access aperture 88 is dimensioned to be slightly larger than the outer diameter of the coupling portion of the rotatable shaft 84 that is inserted into the housing 21. It is important to note that the relatively small size of the access aperture 88 has the advantage of not adversely affecting the structural integrity of the housing cover 23. This advantage is of considerable importance when the access aperture 88 is provided on the housing of a small or very small form factor data storage system. It is to be understood, however, that the advantages of the present invention are not limited to small form factor data storage systems, but are also applicable to data storage system housings having standard dimensions or dimensions other than those associated with small form factor configurations. After the servo writing procedure is completed, the rotatable shaft 84 is removed from the housing 21, and a sealing material, preferably a circular piece of sealing tape 94, is placed over the access aperture 88. It has been determined that the novel servo writing apparatus 90, unique housing 21 configuration, and novel actuator 30 coupling features provide significantly improved servo writer yields and minimizes housing base 22 and cover 23 distortion.

Figure 8:
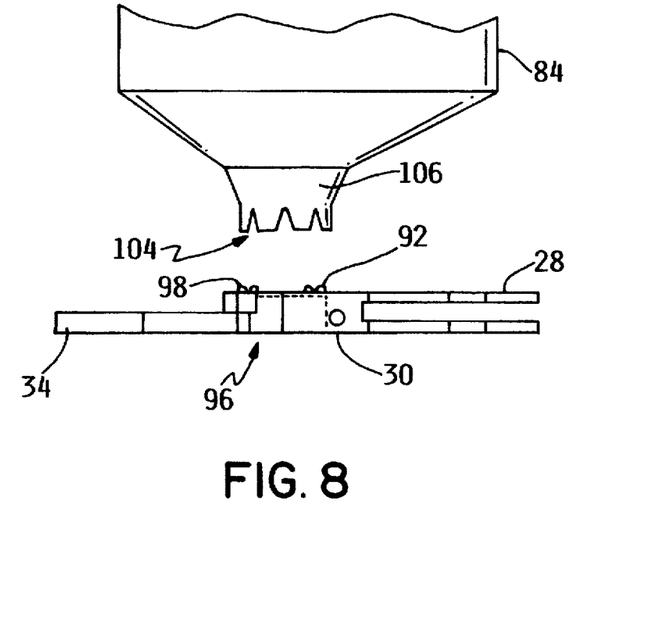
FIG. 8 is an illustration of a novel actuator configured to provide precision mating engagement with the rotatable shaft of a precision pivot assembly.
Figure 9:
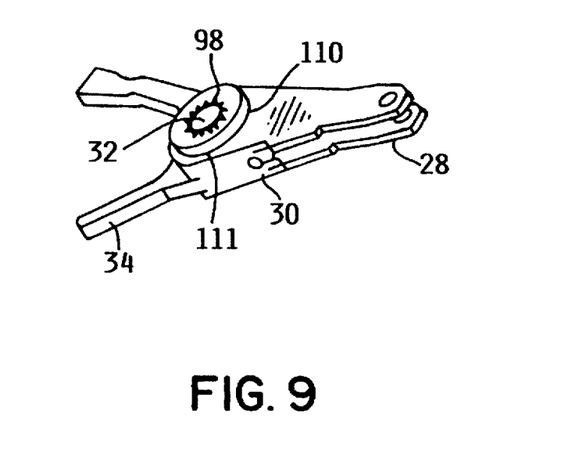
FIG. 9 is a top perspective view of a novel actuator employing a coupling collar to facilitate precision mating engagement with the rotatable shaft of a precision pivot assembly.

In FIGS. 8 and 9, there is shown an actuator 30 having an actuator coupler 92 disposed thereon and adapted for engaging a corresponding shaft coupler 106 provided on the end of the rotatable shaft 84 of the precision pivot assembly 80. The actuator 30 preferably includes a cylindrical bore 96 provided for rotatably mounting the actuator 30 about an actuator shaft 32 typically provided on the housing base 22. In one configuration, the actuator coupler 92 comprises a coupling collar 110 preferably fabricated as an integral plastic body having a ring portion 111 and a plurality of upwardly extending engagement teeth 98 spaced around the inner diameter of the coupling collar 110 proximate the actuator shaft 32. The engagement teeth 98 may alternatively be configured to extend radially outward from the inner diameter of the coupling collar 110 toward the ring portion 111. The diameter of the ring coupling collar 110 is preferably dimensioned in relation to the diameter of the cylindrical bore 96 of the actuator 30 to provide a snug fit when the coupling collar 110 is inserted into the cylindrical bore 96.

In one embodiment, the coupling collar 110 is preferably fabricated as an integral plastic module which, during assembly of the data storage system 20, may easily be registered with and inserted into the cylindrical bore 96 of the actuator 30. The engagement teeth 98 of the coupling collar 110 are preferably configured to precisely engage or mesh with receiving shaft notches 104 disposed on the end of the shaft coupler 106. The precision coupling features of the engagement notches 104 and the engagement teeth 98 provide precision engagement between the actuator 30 and precision pivot assembly 80 during the servo writing procedure.

Figure 10:
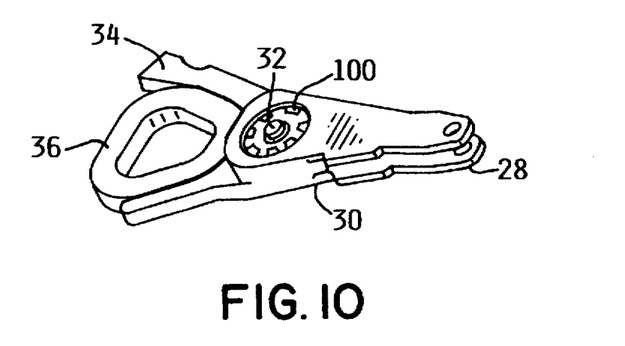
FIG. 10 is a top perspective view of an alternative embodiment of a novel actuator adapted for providing precision mating engagement with the rotatable shaft of a precision pivot assembly.
Figure 11:
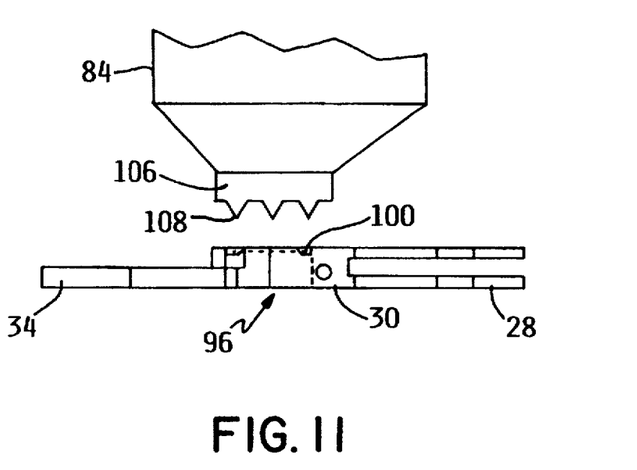
FIG. 11 is a side plan view of a novel actuator configured to precisely mate with corresponding coupling arrangements provided on the rotatable shaft of a precision pivot assembly.
Figure 12:
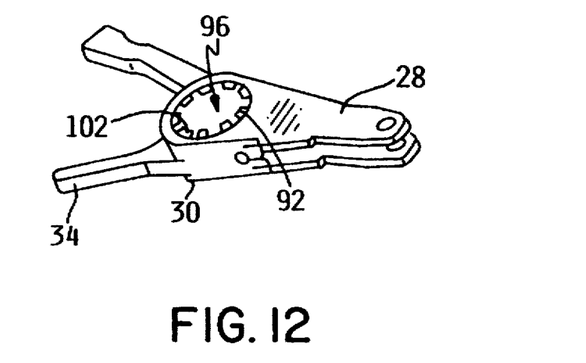
FIG. 12 is a top perspective view of a novel actuator configuration employing a plurality of engagement tabs to facilitate precision mating engagement with the rotatable shaft of a precision pivot assembly.

In another embodiment, as illustrated in FIGS. 10–12, the actuator 30 is preferably precision machined to include a plurality of spaced integral engagement notches 100 disposed about the circumference of the cylindrical bore 96. The rotatable shaft 84 of the precision pivot assembly 80 preferably includes a shaft coupler 106 having a plurality of shaft teeth 108 configured to precisely engage corresponding engagement notches 100 of the actuator 30. In another embodiment, as shown in FIG. 12, the cylindrical bore 96 is preferably machined to include a plurality of integral spaced engagement tabs 102 configured to engage corresponding shaft teeth 108 provided on the end of the rotatable shaft 84.

Figure 13:
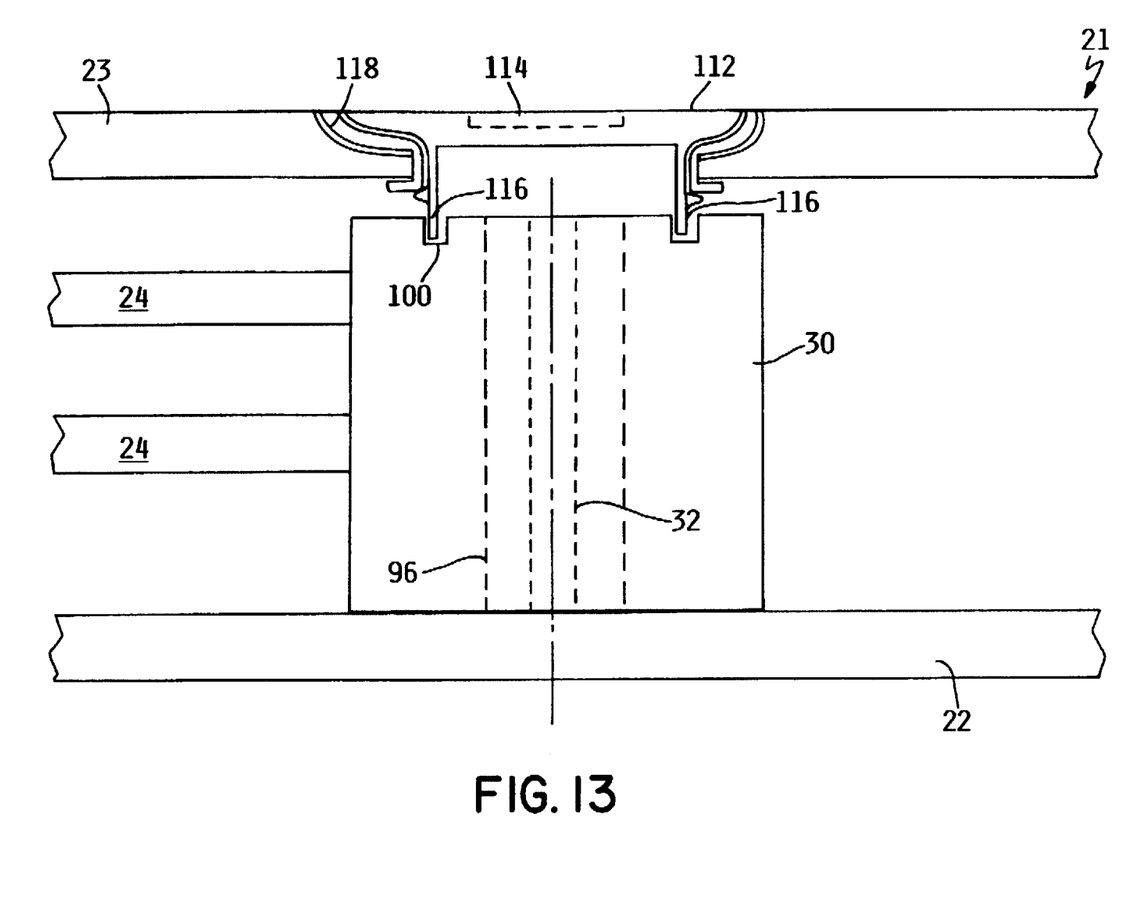
FIG. 13 is a side plan view of an alternative novel actuator configuration employing a rotatable coupling module disposed on the housing cover adapted to engage both the actuator and the rotatable shaft of a precision pivot assembly.

In FIG. 13, there is shown an alternative embodiment of the actuator coupler 92 wherein a coupling module 112 is employed to facilitate precision engagement between the actuator 30 and the precision pivot assembly 80 without introducing any portion of the rotatable shaft 84 into the substantially contaminant-free environment of the data storage system housing 21. In one embodiment, the coupling module 112 is substantially cylindrical in configuration having a shaft engagement recess 114 for engaging the rotatable shaft 84 of the precision pivot assembly 80 and a plurality of engagement teeth 116 configured to matingly engage corresponding engagement notches 100 provided on the actuator 30. Upon securing the housing cover 23 to the base 22, the engagement teeth 116 of the coupling module 112 are preferably received by corresponding engagement notches 100 disposed on the actuator 30. The shaft coupler 106 of the precision pivot assembly 80 then engages the shaft engagement recess 114 for precisely rotating the actuator 30 when writing servo information to the data storage disks 24. Upon completion of the servo writing procedure, the coupling module 112 is preferably removed from the cover 23, and the resulting aperture is then sealed with sealing tape 94 or by other known sealing methods.

Figure 14:
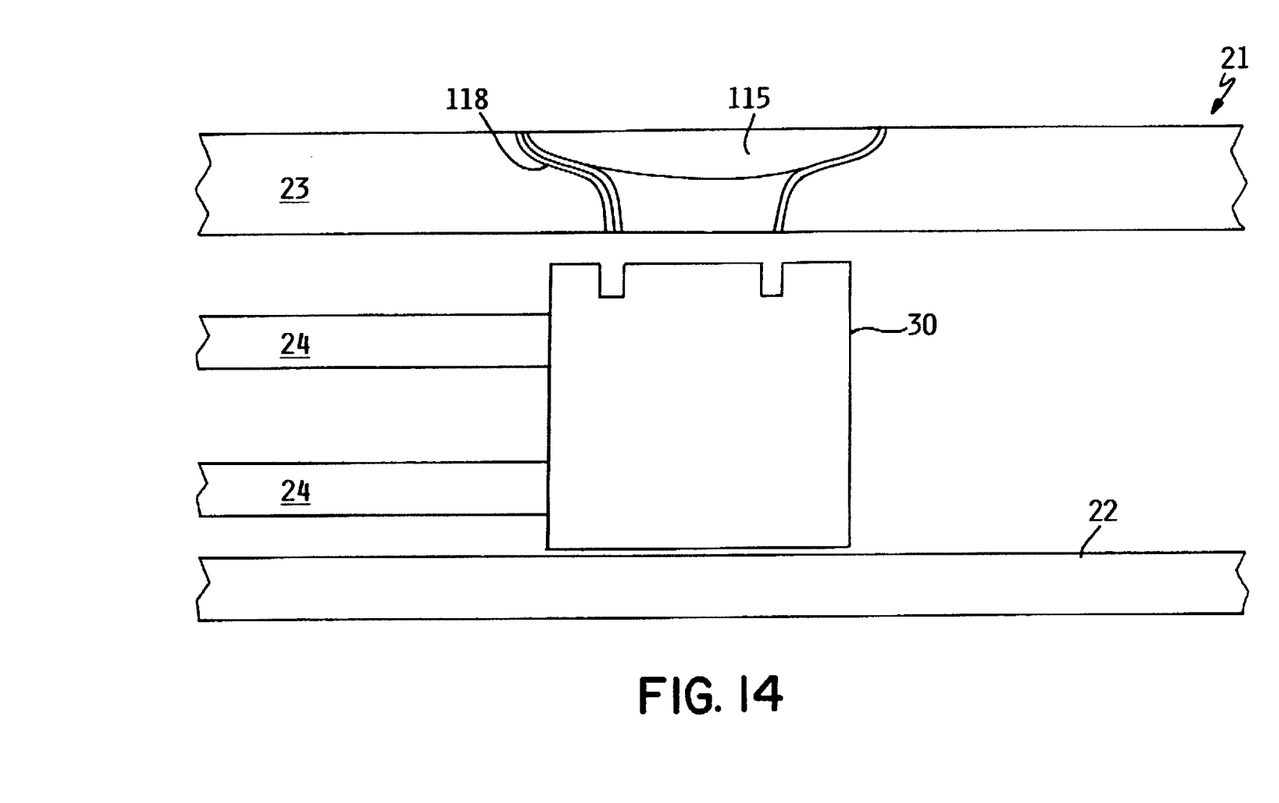
FIG. 14 is a side plan view of an air filter module inserted into an access aperture of a novel housing cover configuration.

Alternatively, as shown in FIG. 14, a small air filter module 115 having a configuration substantially similar to the coupling module 112 may be installed in the access aperture 88 instead of placing the sealing tape 94 over the access aperture 88. In an alternative configuration, the air filter 115 module may be integrated as part of the sealing tape 94 structure to provide filtering of any air passing into and out of the data storage system housing 21. It is generally understood that hermetically sealing a data storage system housing 21 is both an expensive and problematic procedure. Most data storage system housings 21 exhibit a minimal amount of air leakage when the air pressure inside the housing 21 differs from the ambient air pressure outside of the housing 21. The air filter is preferably designed to permit a minimal amount of air flow into and out of the housing 21 to facilitate air pressure equilibration. As such, air leakage from non-filtered access locations within the housing 21 is substantially eliminated.

Figure 15:
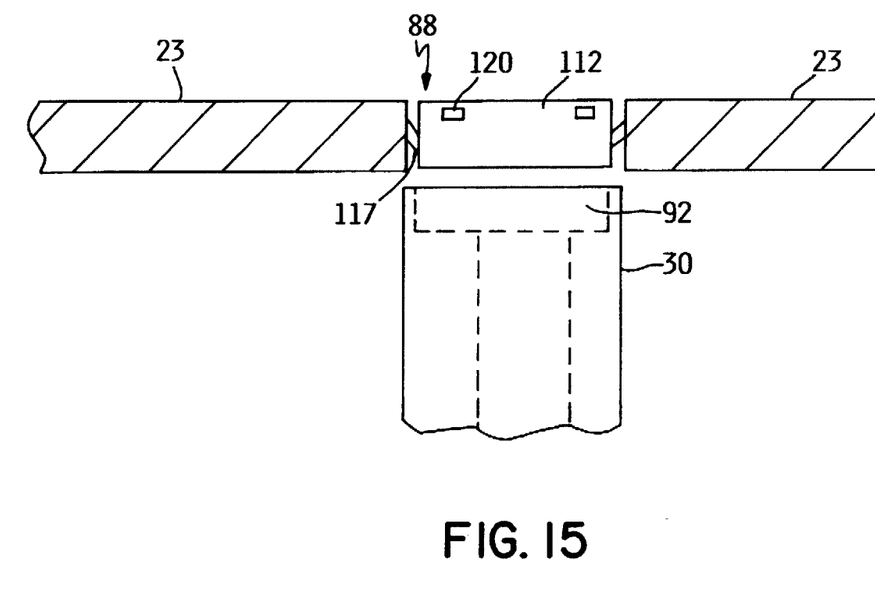
FIG. 15 is a side plan view of a novel permanent coupling module for coupling the rotatable shaft of a precision pivot assembly with an actuator.
Figure 16:
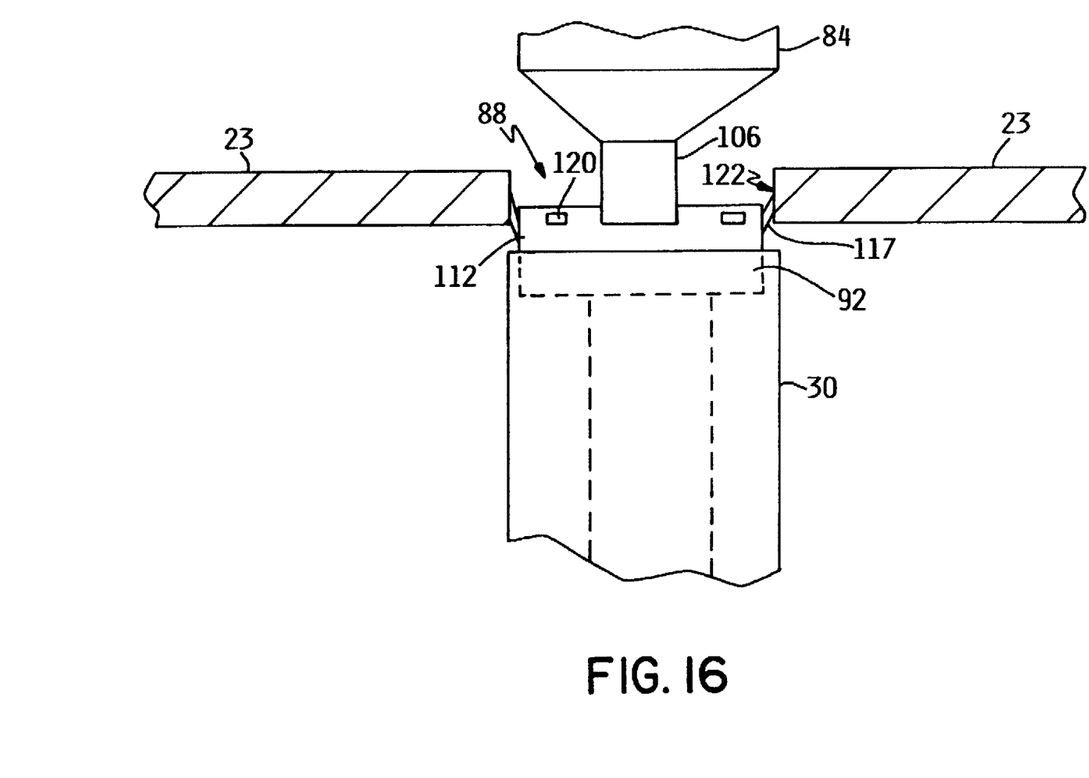
FIG. 16 is a side plan view of a novel coupling module having one or more rotation limiting tabs disposed thereon for limiting the rotation of the actuator when the coupling module rotates the actuator during the servo writing procedure.

In another embodiment, the coupling module 112 includes a retracting mechanism for moving the coupling module 112 out of engagement with the actuator 30 after completion of the servo writer procedure. Rather than being disengaged from the actuator 30 and removed entirely from the housing cover 23, the coupling module 112 preferably retracts into a non-engagement configuration with respect to the actuator 30 during subsequent normal use of the data storage system 20. A spring-type mechanism 117, illustrated in FIGS. 15 and 16, is preferably incorporated as part of the coupling module 112 to facilitate retraction of the coupling module 112 out of engagement with the actuator 30. Additional sealing material 118 disposed between the cover 23 and the coupling module 112 may be included to enhance the environmental sealing of the data storage system housing 21. In accordance with this embodiment, the coupling module 112 may be detachably or permanently installed in the housing cover 23.

As further illustrated in FIGS. 15 and 16, the coupling module 112 may be included as a permanent component of the cover 23 and may also include one or more rotation limiting tabs 120. It may be desirable to limit the range of rotation of the actuator 30 during the servo writer procedure to ensure that the actuator 30 is not subjected to unintended over-rotation. One or more rotation limiting tabs 120 are preferably disposed on the coupling module 112 and engage a sidewall 122 of the cover 23 defining the access aperture 88 when the coupling module 112 and actuator 30 are rotated to a maximum angle of rotation. The coupling module 112 is preferably configured to matingly engage an actuator coupler 92 provided within the cylindrical bore 96 of the actuator 30. It is to be understood that various configurations to facilitate precision coupling between the actuator 30 and the rotatable shaft 84 of the precision pivot assembly 80 may be employed without departing from the scope of the present invention. Further, the coupling module 112 and coupling collar 110 may be fabricated from materials other than plastic, such as metallic or composite materials, for example.

An important advantage of the novel apparatus for precisely rotating and positioning the actuator 30 and transducers 27 during the servo writing procedure concerns the significant reduction or virtual elimination of unintended residual positional movement of the actuator 30 and transducer 27 associated with prior art servo writing assemblies when writing servo data to the data storage disk 24. Another significant advantage of the present invention concerns the elimination of the non-linear cooperative operation between the rotatably mounted actuator 30 and the push-rod 62 of a prior art linear displacement assembly 60 which can otherwise introduce varying degrees of transducer 27 misalignment.

Figure 4:
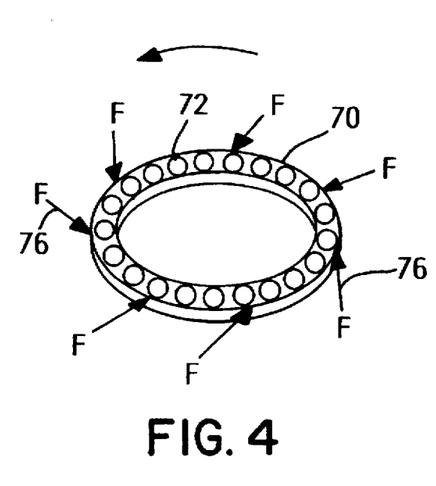
FIG. 4 is an illustration of the distribution of torquing forces imparted on the circumference of a bearing cartridge by a novel servo information recording apparatus.

The unique manner in which the precision pivot assembly 80 of the servo writer assembly 90 engages the actuator 30 results in a substantially equal distribution of torquing forces exerted on the actuator 30 when being rotated by the precision pivot assembly 80. The actuator 30 preferably includes a cylindrical bore 96 within which one or more bearing cartridges 70 are disposed to provide smooth rotation of the actuator 30 about the stationary actuator shaft 32. As discussed previously in detail, the actuator 30 preferably includes an actuator coupler 92 configured to matingly engage a corresponding shaft coupler 106 disposed on the end of the rotatable shaft 84 of the precision pivot assembly 80. By engaging the actuator 30 at a plurality of engagement locations around the actuator's axis of rotation, the torquing forces produced by the rotational movement of the precision pivoting assembly 80 are equally distributed at the plurality of engagement locations. Accordingly, the torquing forces imparted to the bearing cartridge 70 and ball bearings 72 are distributed substantially equally around the circumference of the bearing cartridge 70. As such, any deleterious residual shifting of individual ball bearings 72 or the bearing cartridge 70 is virtually eliminated or significantly reduced to inconsequential levels.

It will, of course, be understood that various modifications and additions can be made to the embodiments discussed hereinabove without departing from the scope or spirit of the present invention. For example, the actuator coupler 92 or coupling module 112 may be configured for application with an actuator shaft 32 that is either pivotally mounted or statically mounted to the housing 21. For a statically mounted actuator shaft 32, a screw may be employed to secure the cover 23 to the stationary actuator shaft, with the screw effectively sealing the access aperture 88. In a configuration in which the actuator shaft 32 is pivotally mounted to the housing 21, the ball bearings 72 and/or bearing cartridge 70 are preferably disposed between the actuator shaft 32 and a stationary structure of the housing 21 adapted to receive the actuator shaft 32 for rotation therein. In this configuration, the novel housing 21 configuration and servo writing apparatus 90 and methodology provides for the equal distribution and passivation of torquing forces around the actuator 30 and bearings 72 resulting in the virtual elimination of unintended residual positional shifting of the actuator 30 and transducers 27 during the servo writing procedure. Accordingly, the scope of the present invention should not be limited by the particular embodiments discussed above, but should be defined only by the claims set forth below and equivalents of the embodiments discussed above.

What is claimed is:

1. A system for storing data adapted for use with a separate servo writer assembly having a pivot assembly with a rotatable shaft, the data storing system comprising;

a housing defining an access aperture thereon;

a data storage disk;

a spindle motor mounted to the housing and adapted for rotating the data storage disk;

an actuator pivotally mounted to the housing on an axis of rotation;

a transducer mounted to the actuator; and coupling means, disposed on the actuator proximate the access aperture, for coupling the pivot assembly with the actuator at more than one coupling location around the axis of rotation of the actuator when writing servo information to the disk.

2. A system as claimed in claim 1, wherein the housing comprises a base and a cover, and the cover defines the access aperture proximate the actuator axis.

3. A system as claimed in claim 1, wherein the access aperture is substantially circular and has a diameter larger than the outer diameter of the rotatable shaft of the pivot assembly.

4. A system as claimed in claim 1, wherein the coupling means comprises an actuator coupler disposed on the actuator substantially symmetrically around the axis of rotation of the actuator, the actuator coupler having a configuration adapted for engaging the rotatable shaft of the pivot assembly.

5. A system as claimed in claim 1, wherein the coupling means comprises a plurality of engagement notches disposed on the actuator circumferentially around the axis of rotation of the actuator and adapted for coupling with corresponding engagement teeth disposed on the rotatable shaft of the pivot assembly.

6. A system as claimed in claim 1, wherein:

the actuator defines a cylindrical bore around the axis of rotation adapted for pivotally mounting the actuator to the housing;

and the coupling means comprises an actuator coupler disposed within a portion of the cylindrical bore and having a configuration adapted for engaging the rotatable shaft of the pivot assembly.

7. A system as claimed in claim 1, wherein:

the actuator defines a cylindrical bore around the axis of rotation of the actuator adapted for pivotally mounting the actuator to the housing; and the coupling means comprises a coupling collar engaging a portion of the cylindrical bore and extending outside of the cylindrical bore, and adapted for coupling with the rotatable shaft of the pivot assembly.

8. A system as claimed in claim 1, wherein:

the housing comprises a base and a cover; and the coupling means comprises a rotatable engagement module disposed on the cover being movable between an engaging and non-engaging orientation with respect to the actuator, the engagement module being moved into engagement with the actuator for pivoting the actuator when writing servo information to the disk, and moved out of engagement with the actuator when not writing servo information to the disk.

9. A system as claimed in claim 8, wherein the engagement module is detachable with respect to the cover.

10. A system as claimed in claim 8, wherein the engagement module comprises rotation limitation means for limiting the rotation of the actuator when writing servo information to the disk.

* * * * *